US007231098B2

(12) United States Patent
Wang

(10) Patent No.: US 7,231,098 B2
(45) Date of Patent: Jun. 12, 2007

(54) SHADING NOISE FILTER

(76) Inventor: Kuo-Jeng Wang, 14, Kung-An St., Hsiano-Kang, Kaohsiung City (TW)

( * ) Notice: Subject to any disclaimer, the term of this patent is extended or adjusted under 35 U.S.C. 154(b) by 657 days.

(21) Appl. No.: 10/320,681

(22) Filed: Dec. 17, 2002

(65) Prior Publication Data

US 2004/0114828 A1 Jun. 17, 2004

(51) Int. Cl.
*G06K 9/40* (2006.01)
*G06K 9/46* (2006.01)
*G06K 9/66* (2006.01)

(52) U.S. Cl. .................. 382/274; 382/275; 382/194; 382/167

(58) Field of Classification Search ........... 382/274, 382/275, 163, 165, 167, 170, 172, 194, 169
See application file for complete search history.

(56) References Cited

U.S. PATENT DOCUMENTS 5,500,745 A * 3/1996 Iishiba et al. ............ 358/461
5,920,656 A * 7/1999 Gahang .................. 382/274
6,486,980 B1 * 11/2002 Sawanobori ............ 358/487

* cited by examiner

*Primary Examiner*—Matthew C. Bella
*Assistant Examiner*—Wes Tucker
(74) *Attorney, Agent, or Firm*—Berkley Law & Technology Group, LLP

(57) ABSTRACT

A shading correction is employed for a scanner to correct shading distortion. However, an image corrected with the shading corrective curve has shading noise lines due to the effects of various factors in the producing process of the shading corrective curve. The characteristic of the shading noise is that the each value of any primary color channel, of each pixel in a line is higher or lower than of the adjacent two pixels in other lines, wherein a color channel is one of red, green, or blue channel. Hence, the quality of the image is improved by removing the shading noise detected from the characteristic described above.

32 Claims, 5 Drawing Sheets

SHADING NOISE FILTER

BACKGROUND OF THE INVENTION

1. Field of the Invention

This invention relates to image editing, and more particularly to correcting shading noise.

2. Description of the Prior Art

In general, a scanning process of a scanner includes: moving a light source and a scanning module along a scanning direction by means of a stepper motor. Then, the light source illuminates the material of demand and is reflected into the scanning module. An image is captured by a light sensor such as CCD (Charge-Coupled Device) and is then translated into digital data to be saved.

The digital data of the image is different from the captured data with the light sensor, due to the light provided by the light source not being an ideal linear light and the brightness varying along a direction of the arrangement of the light sensor. The brightness is approximately brighter in the center of the light than in the edge thereof, as shown in FIG. 1A. Therefore, the captured image is brighter in the center of the image than in the edge thereof due to a disproportionate brightness of the light source. In general, the brightness distribution of the light is pre-scanned and the captured data is efficiently corrected through use of the pre-scanned data, as shown in FIG. 1A.

Furthermore, a light sensor is a plurality of CCDs arranged in a line and the data detected by different CCDs is different due to each COD having a different light sensitivity. Moreover, external factors may vary with time, for example: the variant of light resulting from a power supply varying with time, the variant in the light sensitivity of the CCD with time, etc. These factors are generally called "shading distortion". Therefore, the data of the image is corrected for the elimination of the disproportionate distribution of the light, but the corrected data still has a problem of being uneven, resulting from the shading noise, as shown in FIG. 1B.

The corrective method of the shading distortion is that the scanner pre-scans a reference white (a white corrective board) or a reference black (covering with the light sensor before capturing image). The data of the reference white or the reference black is the shading distortion corrective curve. Hence, a captured image can be corrected with the corrective curve to obtain a more corrective image data.

Nevertheless, the shading distortion corrective curve has local maximums or local minimums resulting from the noise of the electrical devices, bad CCDs, or inexact deductive methods. The local maximums or minimums resulting from random noise do not appear every time. The inexact deductive method causes the data to be improperly corrected wrong. These results are generally called "shading noise". If the image data is corrected by a corrective curve that comprises shading noise, the resultant corrected image has some shading noise lines. The shading noise lines in the corrected image are caused by the shading corrective curve. While the shading corrective curve may be one dimensional the shading noise that appears in the resultant corrected image appears as lines in a two-dimensional image in positions correlating to the shading distortions in the corrective curve.

Hence, the shading corrective curve in the conventional arts can correct the problem of shading distortion, but they easily generate problems with shading noise and reduce the quality of the image.

SUMMARY OF THE INVENTION

The conventional arts mentioned above can correct the shading distortion, but generates the problem of the shading noise. In accordance with the present invention, image editing may be used for correcting the shading noise to efficiently improve the problem of the shading noise resulting from the correction of the shading distortion.

It is another object of this invention to employ image editing to correct the shading noise for increasing the image quality.

In accordance with the above-mentioned objects, the present invention provides image editing for correcting the shading noise. In the present invention, it detects the shading noise by means of characteristics of the shading noise, and eliminates the shading noise for an increased image quality.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
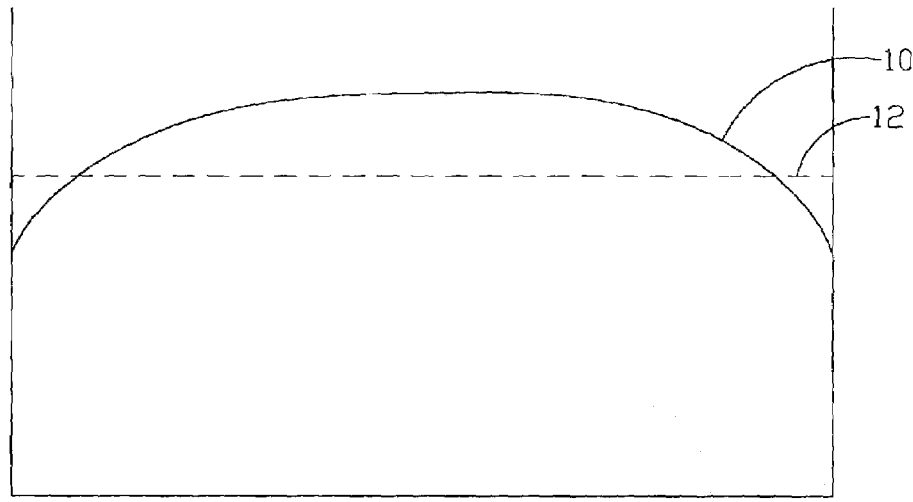
FIG. 1A is a diagram of the disproportionate brightness in a general scanner.
Figure 1B:
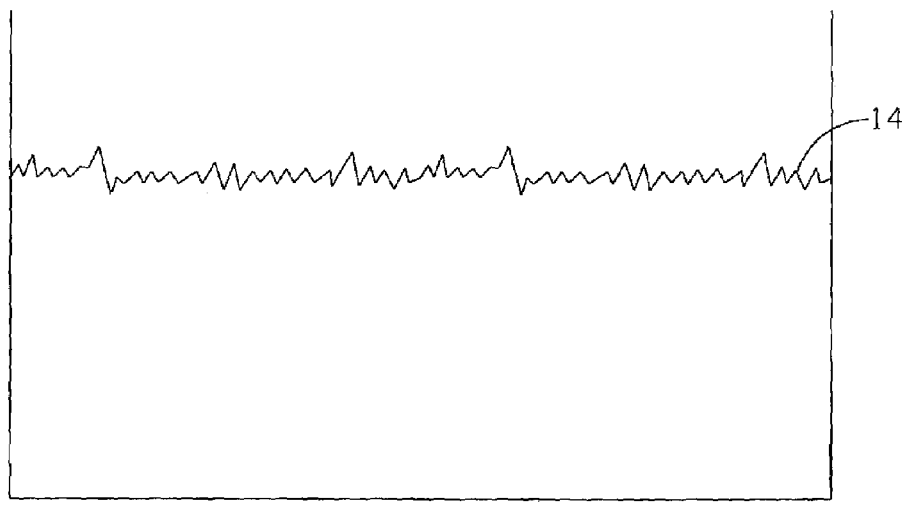
FIG. 1B is a diagram of an image with uneven brightness result from shading noises.
Figure 2:
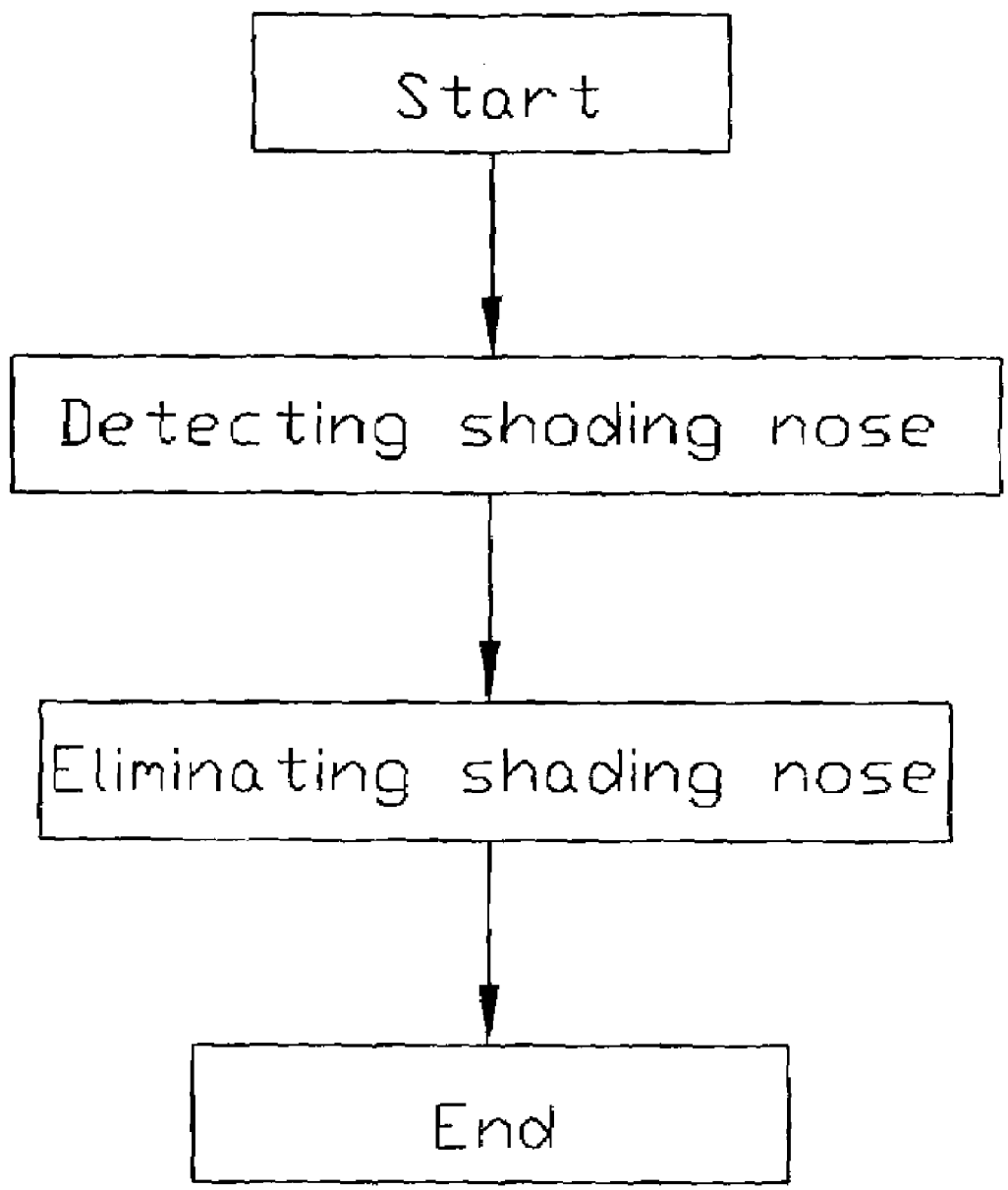
FIG. 2 is a flow chart of eliminating shading noises.
Figure 3:
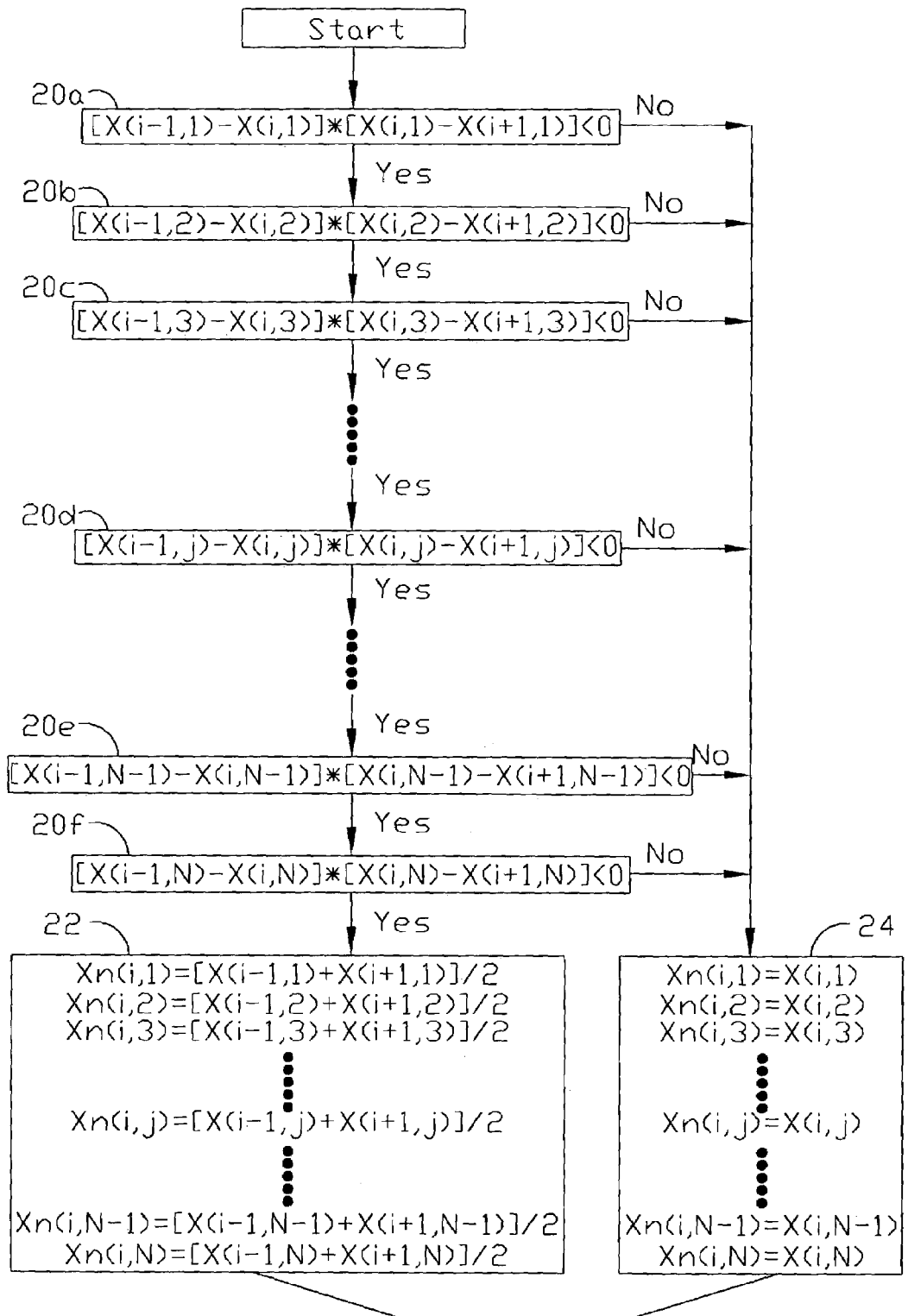
FIG. 3 is a flow chart of mathematical calculation of a shading noise function.
Figure 4A:
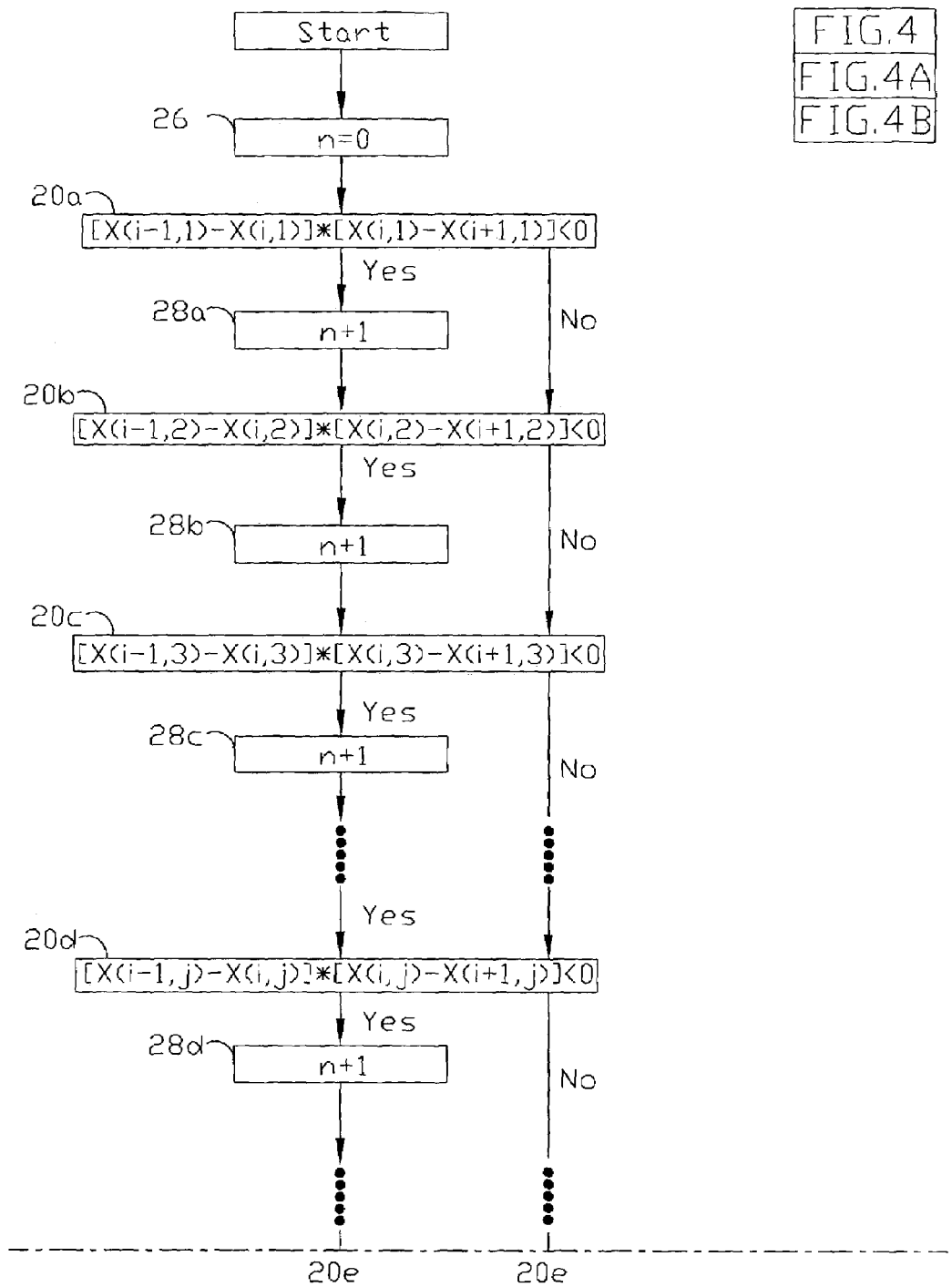
FIG. 4A to FIG. 4B is a flow chart of mathematical calculation of a shading noise function.
Figure 4B:
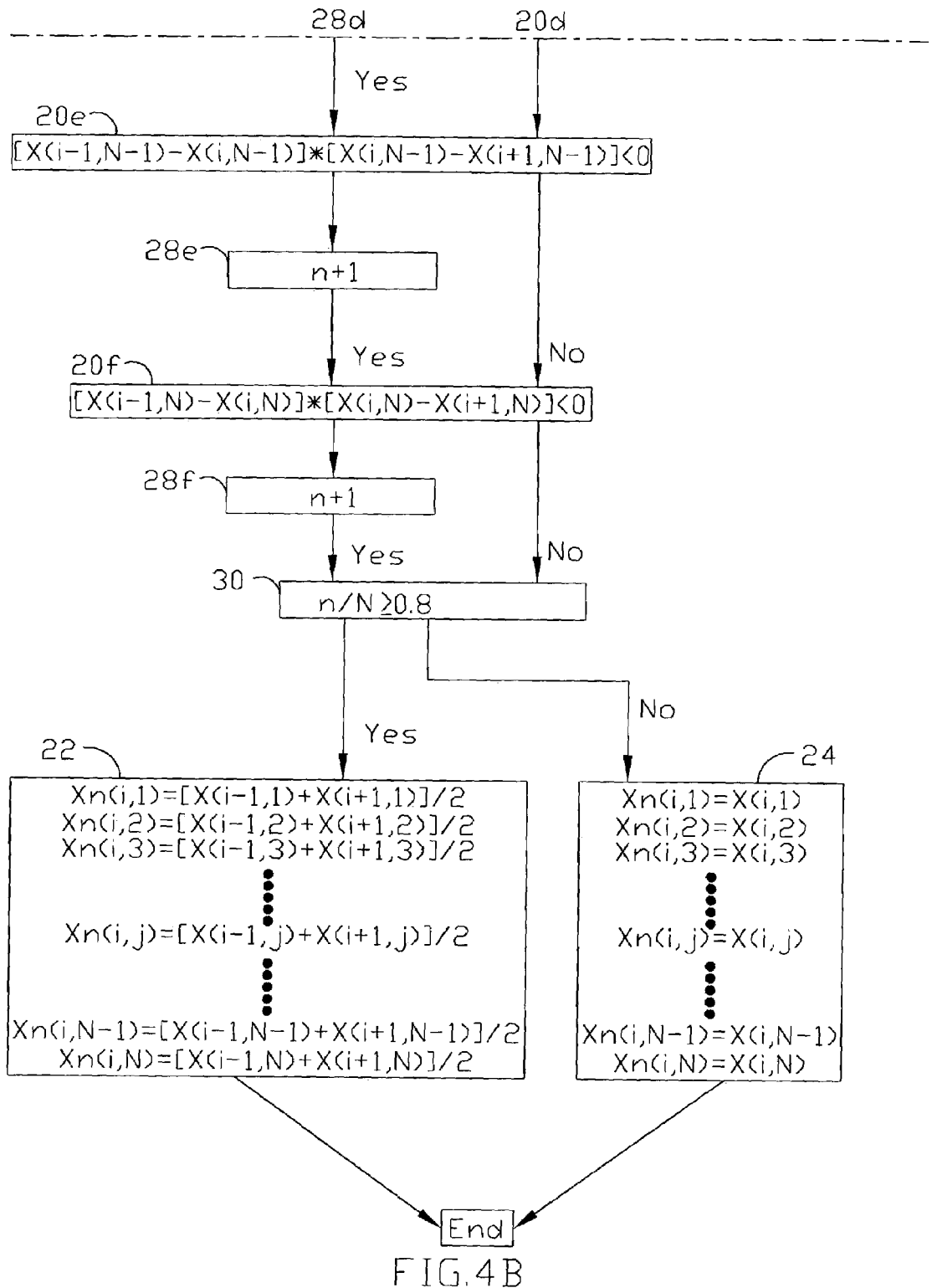

The process of obtaining the shading distortion corrective curve includes measurement with three primary colors RGB (red, green, and blue), respectively. Therefore, the characteristic of the shading noise is a line of one pixel width with one certain primary color in an image. The primary values in the pixels of the lines are lower or higher, than one preselected percentage of pixels (such as one certain percent, for example) of the color values of the primary color, within the two adjacent pixels in the adjacent lines. Therefore, the shading noise of an image can be detected and eliminated by means of the characteristic of the shading noise. The steps of eliminating shading noise are: start, detecting shading noise, eliminating shading noise, and end, as shown in FIG. 2. The characteristic is that one certain color value of the primary color of the pixels with shading noise is higher or lower than the color value of the same primary color of two adjacent pixels. Hence, the detecting function is:

The characteristic is that one certain color value of the primary color of the pixels with shading noise is higher or lower than the color value of the same primary color of two adjacent pixels. Hence, the detecting function is:

$$X(i) > \text{Max}[X(i-1), X(i+1)] \text{ or}$$

$$X(i) < \text{Min}[X(i-1), X(i+1)] \quad (1)$$

wherein $X(n)$ is the nth color value of one certain primary color.

Eq.(1) can be rewritten:

$$[X(i-1)-X(i)][X(i)-X(i+1)] < 0 \quad (2)$$

If the $i^{th}$ pixel of the corrective curve has a shading noise in one certain primary color, the image of two-dimension M×N corrected with the corrective line has a shading noise line ((i,j), j=1 to N). Therefore, Eq. (2) in one-dimension can be rewritten to translate into Eq. (3) in two-dimension:

$$[X(i-1,j)-X(i,j)][X(i,j)-X(i+1,j)]<0 \quad (3)$$

wherein x(ij) is a color value of one certain primary color and 1 is one certain value among 1 to M, j=1to N.

If the Eq. (3) is true during j=1 to N, the line of (i,j: j=1 to N) is a shading noise line. The primary color values with shading noise of the $i^{th}$ line transforms into the average of two adjacent same primary color values in adjacent lines for correcting the shading noise.

$$Xn(i,j)=[X(i-1,j)+X(i+1,j)]/2 \quad (4)$$

wherein the Xn(i,j) is a new corrected color value of (i,j) and j is 1 to N.

If the Eq. (3) is not true during j=1 to N, the line of (i,j: j=1 to N) is not a shading noise line and the color value in the line is not corrected.

$$Xn(i,j)=X(i,j) \quad (5)$$

wherein j is 1 to N.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for eliminating shading noise, comprising:
   detecting one or more shading noise lines of a shading noise in an image based on two adjacent lines;
   eliminating said shading noise from said one or more shading noise lines in said image;
   wherein said detecting one or more shading noise lines comprises detecting one or more shading noise lines by a characteristic of said shading noise; and
   wherein a detecting function of said shading noise is: $[X(i-1,j)-X(i,j)][X(i,j)-X(i+1,j)]<0$, wherein $X(i,j)$ comprises one color value in a coordinate (i,j) of an image, and wherein $X(i-1,j)$ and $X(i+1,j)$ comprise color values of same said color as $X(i,j)$.

2. The method for eliminating shading noise according to claim 1, wherein said characteristic comprises a line with one pixel width and at least one color value of one color in said shading noise line higher than adjacent two pixels in said two adjacent lines.

3. The method for eliminating shading noise according to claim 1, wherein said characteristic comprises a line with one pixel width and at least one color value of one color in said shading noise line higher a certain percent than adjacent two pixels in said two adjacent lines.

4. The method for eliminating shading noise according to claim 1, wherein said characteristic comprises a line with one pixel width and at least one color value of one color in said shading noise line lower than adjacent two pixels in said two adjacent lines.

5. The method for eliminating shading noise according to claim 1, wherein said characteristic comprises a line with one pixel width and at least one color value of one color in said shading noise line lower a certain percent than adjacent two pixels in said two adjacent lines.

6. The method for eliminating shading noise according to claim 1, wherein a line in said image has shading noise if a detecting result of said detecting function is true over a certain percent.

7. The method for eliminating shading noise according to claim 6, wherein said certain percent comprises 80 percent.

8. The method for eliminating shading noise according to claim 2, wherein said color value is red, green, or blue.

9. The method for eliminating shading noise according to claim 3, wherein said color value is red, green, or blue.

10. The method for eliminating shading noise according to claim 1, wherein said shading noises are detected by multiplying a first difference with a second difference, wherein the first difference is taken between a color value of a first adjacent pixel and a color value of a given pixel, and wherein the second difference is taken between a color value of a second adjacent pixel and said color value of said given pixel.

11. The method for eliminating shading noise according to claim 10, wherein a new color value of said given pixel comprises an average of said color value of said first adjacent pixel and said color value of said second adjacent pixel for eliminating said shading noise.

12. The method for eliminating shading noise according to claim 10, wherein said color value of said given pixel is not transformed if detecting shading noise is false.

13. A method for eliminating shading noises, comprising:
    detecting a shading noise in an image by multiplying a first difference with a second difference, wherein the first difference is taken between color values of a first adjacent pixel and a color value of a given pixel, and wherein the second difference is taken between a color value of a second adjacent pixel and said color value of said given pixel;
    determining one or more shading noise lines; and eliminating said shading noise from said one or more shading noise lines in said image; and
    wherein a detecting function of said shading noise is: $[X(i-1,j)-X(i,j)][X(i,j)-X(i+1,j)]<0$, wherein $X(i,j)$ comprises one color value in a coordinate (i,j) of an image, and wherein $X(i-1,j)$ and $X(i+1,j)$ comprise color values of same said color as $X(i,j)$.

14. The method for eliminating shading noise according to claim 13, wherein a line in said image has shading noise if a detecting result of said detecting function is true over a certain percent.

15. The method for eliminating shading noise according to claim 14, wherein said certain percent comprises 80 percent.

16. The method for eliminating shading noise according to claim 13, wherein a new color value of said given pixel comprises an average of said color value of said first adjacent pixel and said color value of said second adjacent pixel for eliminating said shading noise.

17. The method for eliminating shading noise according to claim 13, wherein said color value of said given pixel is not transformed if detecting shading noise is false.

18. An apparatus, comprising:
    means for detecting one or more shading noise lines of a shading noise in an image based on two adjacent lines;
    means for eliminating said shading noise from said one or more shading noise lines in said image;
    wherein said means for detecting one or more shading noise lines comprises means for detecting one or more shading noise lines by a characteristic of said shading noise; and wherein said means for detecting one or more shading noise lines comprises a detecting function of said shading noise comprising: $[X(i-1,j)-X(i,j)][X(i,j)-X(i+1,j)]<0$ wherein $X(i,j)$ comprises one color value in a coordinate (i,j) of an image; $X(i-1,j)$ and $X(i+1,j)$ comprise color values of same said color.

19. The apparatus of claim 18, wherein said characteristic comprises a line with one pixel width and at least one color value of one color in said shading noise line higher than adjacent two pixels in said two adjacent lines.

20. The apparatus of claim 18, wherein said characteristic comprises a line with one pixel width and at least one color value of one color in said shading noise line higher a certain percent than adjacent two pixels in said two adjacent lines.

21. The apparatus of claim 18, wherein said characteristic comprises a line with one pixel width and at least one color value of one color in said shading noise line lower than adjacent two pixels in said two adjacent lines.

22. The apparatus of claim 18, wherein said characteristic comprises a line with one pixel width and at least one color value of one color in said shading noise line lower a certain percent than adjacent two pixels in said two adjacent lines.

23. The apparatus of claim 18, wherein a line in said image has shading noise if a detecting result of said detecting function is true over a certain percent.

24. The apparatus of claim 23, wherein said certain percent comprises 80 percent.

25. The apparatus of claim 18, wherein said means for detecting one or more shading noise lines comprises means for detecting one or more shading noise lines by multiplying a first difference with a second difference, wherein the first difference is taken between a color value of a first adjacent pixel and a color value of a given pixel, and wherein the second difference is taken between a color value of a second adjacent pixel and said color value of said given pixel.

26. The apparatus of claim 18, wherein a new color value of said given pixel comprises an average of said color value of said first adjacent pixel and said color value of said second adjacent pixel for eliminating said shading noise.

27. The apparatus of claim 25, wherein said color value of said given pixel is not transformed if detecting shading noise is false.

28. An apparatus, comprising:
a scanner, said scanner capable of:
detecting a shading noise in an image by multiplying a first difference with a second difference, wherein the first difference is taken between color values of a first adjacent pixel and a color value of a given pixel, and wherein the second difference is taken between a color value of a second adjacent pixel and said color value of said given pixel;
determining one or more shading noise lines; and eliminating said shading noise from said one or more shading noise lines in said image; and
wherein said scanner is further capable of detecting a shading noise by a detecting function of said shading noise comprising: $[X(i-1,j)-X(i,j)][X(i,j)-X(i+1,j)]<0$ wherein $X(i,j)$ comprises one color value in a coordinate (i,j) of an image; $X(i-1,j)$ and $X(i+1,j)$ comprise color values of same said color.

29. The apparatus of claim 28, wherein a line in said image has shading noise if a detecting result of said detecting function is true over, a certain percent.

30. The apparatus of claim 29, wherein said certain percent comprises 80 percent.

31. The apparatus of claim 28, wherein a new color value of said given pixel comprises an average of said color value of said first adjacent pixel and said color value of said second adjacent pixel for eliminating said shading noise.

32. The apparatus of claim 28, wherein said color value of said given pixel is not transformed if detecting shading noise is false.

* * * * *

UNITED STATES PATENT AND TRADEMARK OFFICE
CERTIFICATE OF CORRECTION

PATENT NO. : 7,231,098 B2
APPLICATION NO. : 10/320681
DATED : June 12, 2007
INVENTOR(S) : Kuo-Jeng Wang It is certified that error appears in the above-identified patent and that said Letters Patent is hereby corrected as shown below:

On the Title Page
Item (76) line 2 (Inventors): Delete "Hsiano-Kang," and insert -- Hsiao-Kang, --, therefor; and Column 6, line 26 (Claim 29): Delete "over," and insert -- over --, therefor.

Signed and Sealed this
Fifth Day of April, 2011

David J. Kappos
*Director of the United States Patent and Trademark Office*